(12) United States Patent
Conley

(10) Patent No.: US 7,377,230 B2
(45) Date of Patent: May 27, 2008

(54) COMBINATION BIRDHOUSE AND BIRD FEEDER DEVICE

(76) Inventor: Keats Conley, 2208 Sunset, Boise, ID (US) 83702

( * ) Notice: Subject to any disclaimer, the term of this patent is extended or adjusted under 35 U.S.C. 154(b) by 233 days.

(21) Appl. No.: 11/319,301

(22) Filed: Dec. 27, 2005

(65) Prior Publication Data

US 2007/0144450 A1    Jun. 28, 2007

(51) Int. Cl.
*A01K 31/00* (2006.01)
*A01K 39/01* (2006.01)

(52) U.S. Cl. .................... 119/429

(58) Field of Classification Search .......... 119/429, 119/428, 430, 431, 432, 433, 434, 435, 51.01, 119/52.2, 52.3, 52.4, 61.4
See application file for complete search history.

(56) References Cited

U.S. PATENT DOCUMENTS

| 1,373,799 | A | | 4/1921 | Conley |
|---|---|---|---|---|
| 2,392,532 | A | | 1/1946 | Hyde |
| 3,126,870 | A | * | 3/1964 | Matthew ............... 119/57.9 |
| 3,295,498 | A | | 1/1967 | Brown |
| 3,505,975 | A | | 4/1970 | Spencer |
| 3,566,842 | A | | 3/1971 | Oldaker |
| 3,742,914 | A | | 7/1973 | Spencer et al. |
| 4,167,917 | A | | 9/1979 | Noll |
| 4,738,221 | A | | 4/1988 | Nock |
| 4,917,047 | A | | 4/1990 | Wazeter, III |
| 5,746,156 | A | | 5/1998 | Petrides et al. |
| D421,509 | S | | 3/2000 | Carpenter |
| 6,192,832 | B1 | * | 2/2001 | Husnik ............... 119/57.9 |
| 6,477,983 | B1 | * | 11/2002 | Bette ................. 119/428 |
| 6,598,561 | B1 | * | 7/2003 | Johns ................ 119/57.9 |
| 2004/0020444 | A1 | | 2/2004 | Missry |

* cited by examiner

*Primary Examiner*—Yvonne R. Abbott
(74) *Attorney, Agent, or Firm*—Stephen M. Nipper; Dykas, Shaver & Nipper, LLP

(57) ABSTRACT

A combination birdhouse and bird feeder configured for rotation from a bird feeding mode to a bird housing/nesting mode. The device having the ability to be locked in the bird feeding position as well as being locked in the bird housing position.

17 Claims, 2 Drawing Sheets

COMBINATION BIRDHOUSE AND BIRD FEEDER DEVICE

FIELD OF THE INVENTION

The invention generally relates to animal husbandry devices and more particularly relates to devices able to be converted between a bird feeder and a birdhouse.

BACKGROUND OF THE INVENTION

Bird lovers, bird watchers and ornithologists frequently erect birdhouses for housing birds when they are nesting as well as bird feeders for feeding birds. Birdhouses tend to be used only part of the year, typically during "nesting" season. Bird feeders, likewise, tend to be used more heavily in cold, snowy portions of the year when natural feed sources are scarce. Thus, it is not uncommon for a birdhouse to be used only a small portion of the year, and for a bird feeder to only be heavily used for a different portion of a year.

To wit, prior inventors have sought to create combination birdhouses/bird feeders. For instance, the Carpenter patent (U.S. Pat. No. Des. 421,509), the Hyde patent (U.S. Pat. No. 2,392,532), the Spencer, et al., patent (U.S. Pat. No. 3,742,914), the Spencer patent (U.S. Pat. No. 3,505,975), the Petrides, et al., patent (U.S. Pat. No. 5,746,156), the Brown patent (U.S. Pat. No. 3,295,498), the Noll patent (U.S. Pat. No. 4,167,917) and the Missry application (U.S. Published Patent Application No. US 2004/0020444).

All of these prior art patents trying to create a single device that is able to convert from a bird shelter into a bird feeder. The present invention solves this same need.

SUMMARY OF THE INVENTION

One embodiment of the present invention is a combination birdhouse and birdfeeder device convertible between a birdhouse mode and a bird feeder mode. This combination device configured for attaching to an object such as a fence post or tree. The combination device comprising a housing, a pivotable attachment and a lock.

The housing has an internal chamber therein appropriately sized for both storing birdseed, and alternatively, for providing a nesting chamber for a bird. The housing having at least one outside surface through which is found a hole. This hole being preferably adjacent to the second end and serves the dual purpose of being an entry for the bird (into the nesting box) and an exit for birdseed (for feeding birds).

The pivotable attachment is for interconnecting the housing to the object (fence post, tree). The pivotable attachment allows the housing to rotate about its horizontal axis, from a feeding position where the first end is oriented above the second end to a nesting position where the second end is above the first end.

The lock allows the device to be locked in the feeding position and/or the nesting position, thereby holding it firm so that the combination device does not pivot except when so desired by the user.

It is further provided that the second end connects with a base portion, this base portion providing a feed holding portion when the device is in its feeding position, and wherein the base portion comprises a feed holding portion. The base portion comprises a roof portion when the combination device is in its nesting position. It is also preferred that first end have a lid portion for closing the first end, the lid portion configured for both opening and closing, having a hinge allowing the lid to be hingedly connected thereto in such an orientation the lid being likewise configured for being locked in a shut position.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention, which is measured by the claims, nor is it intended to be limiting as to the scope of the invention in any way.

Still other features and advantages of the present invention will become readily apparent to those skilled in this art from the following detailed description describing only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 2:
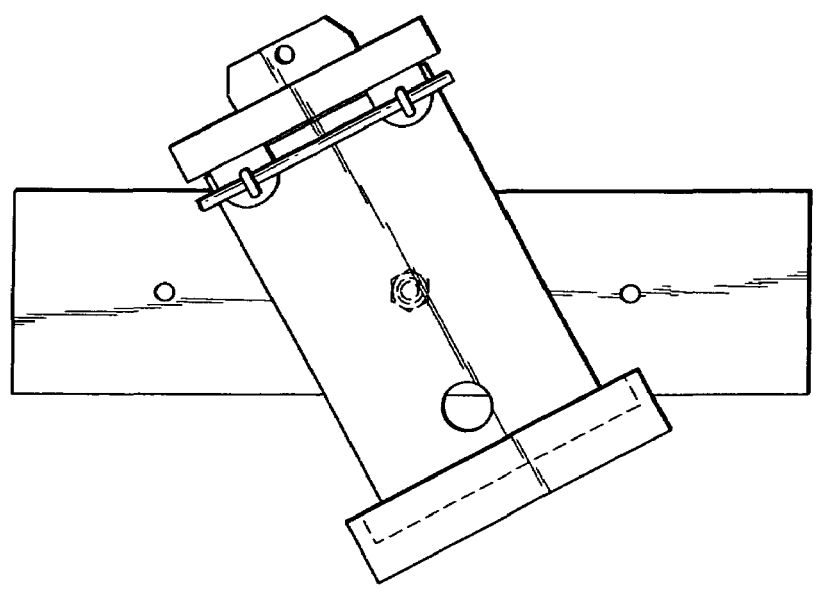
FIG. 2 shows a second front side view of the embodiment of FIG. 1 shown partially rotated.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a combination bird feeder and bird nesting box. This combination device convertible from a feeding position to a nesting position. This allows the person owning and maintaining the device to, rather than own both a birdhouse and a bird feeder, to instead (should they choose to do so) have a single device that accommodates both needs.

Figure 5:
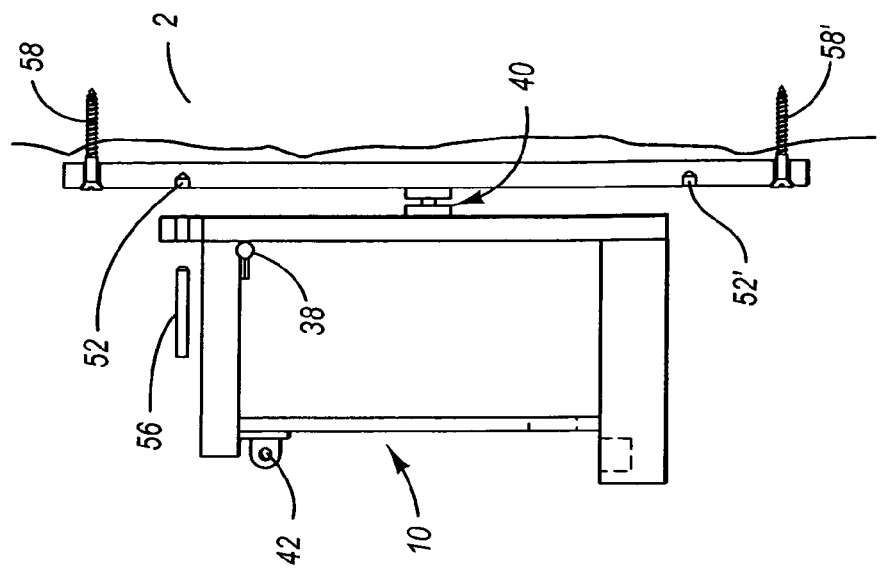
FIG. 5 is a side cross-sectional view of a second embodiment of the present invention.

One embodiment of the present invention is shown in FIGS. 1-4, whereas a second embodiment of the present invention is shown in FIG. 5. While these two specific embodiments are shown in the drawings, obviously other embodiments are envisioned and thus these figures not intended to be exclusive.

Now referring initially to FIGS. 1-4, shown is one embodiment of the present invention. Figures showing the present invention configured for attaching to an object 2 such as a tree or fence post. Other manners and types of attachments are likewise envisioned. The present invention being a combination birdhouse/feeder device 10.

The device 10 having a housing 20 defining therein an internal chamber 22. The device 10 having at least one outside surface 24. The embodiment of the present invention shown in the figures has a front, a back, two opposing sides as well as a top end and a bottom end. Through the outside surface is defined a hole 30. This hole 30 serving as both an entry passageway for birds for nesting purposes, as well as an exit passageway for feed 4 when used in the feeding position.

It is preferred that the present invention be comprised of wood, however, other materials including but not limited to metal, plastic, ceramics, composites, etc., to likewise be used.

In the embodiment shown, the housing has a first end 26 and a second end 28. The second end 28 further comprising a feed holding portion/roof portion 32, whereas the first end 26 is preferably openable, being lidded (lid portion 36). While the preferred embodiment discloses the use of a housing having a closed second end 28 and an openable first end 26, it is envisioned that any combination thereof could be utilized, including but not limited to both ends being closed, both ends being hinged or otherwise openable or one or the other.

The first end 26 having a lid portion 36 hingedly attached thereto through use of a hinge portion 38 (shown in FIG. 5). The lid portion 36 hingedly attaches to the housing 20 through use of the hinge portion 38. The lid portion 36 configured for locking shut through use of a lid lock 42. The type of lid lock 42 shown in the drawings is not intended as a limitation to the types of lid locks which can be used in practicing the present invention. Further, while a hinged attachment is preferred, other manners of allowing the first end to be opened are likewise envisioned.

Figure 4:
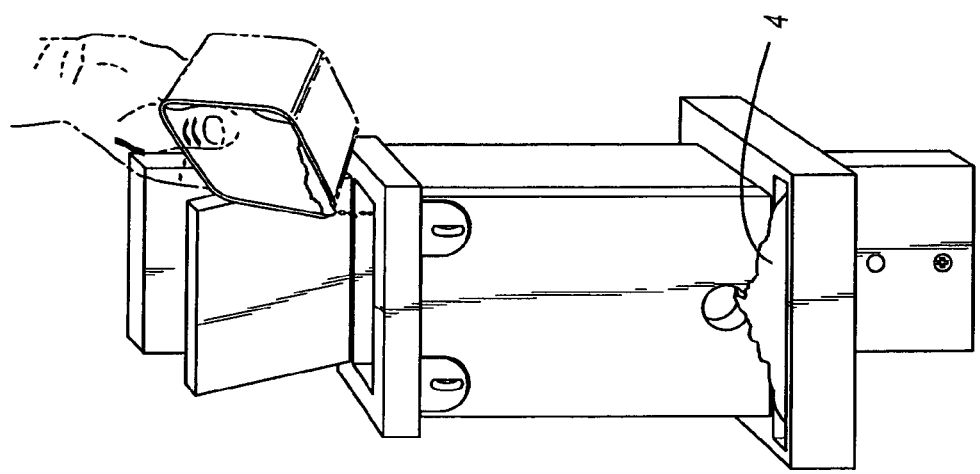
FIG. 4 is a perspective view of the embodiment of FIG. 1.

It is preferred that at least one of the ends be configured for opening (preferably the first end) so that the internal chamber 22 of the housing 20 can be accessed. Reasons for access include adding feed 4 to the combination birdhouse/feeder device 10 (as shown in FIG. 4), inspecting the bird nest/eggs held therein and/or cleaning out the internal chamber 22 when converting the box from its nesting position to its feeding position.

In the embodiment shown in FIG. 5, the housing 20 attaches to an attachment portion 48 through use of a pivotable attachment assembly 40. This pivotable attachment assembly 40 preferably allowing for a complete 360 degree rotation of the housing 20 relative to the attachment portion 48. While that is the case, obviously, the pivotable attachment assembly could be configured for allowing a lesser degree of rotation. It is further preferred that the rotation of the housing 20 from its feeding position to its nesting position back to its feeding position be provided with a manner of fixing or locking the present invention within either one or both of those modes.

In the embodiment shown in these figures, the top of the housing is provided with a flange 46 having defined therein a housing lock hole 54. This housing lock hole 54 (which is part of the pivot lock assembly 50) is configured for alignment with a pair of attachment portion lock holes 52, 52', so that a locking rod/peg 56 can be inserted through the housing lock hole 54 and into the attachment portion lock hole 52 thereby locking the housing in its nesting position, and further, the locking rod 56 can be inserted through the housing lock hole 54 and into the attachment portion lock hole 52' thereby locking the housing 20 in its feeding position. While this manner of locking the present invention in one or the other positions is disclosed as a preferred way of doing it, other manners of locking the combination device in position is likewise envisioned and could be used including other types of fasteners, mechanical means, etc.

In FIG. 5, the attachment portion 48 (which pivotally connects to the housing 20 via the pivotable attachment 40) is configured for attachment to an object 2. In the preferred embodiment, a pair of screws 58, 58' are used to screw the attachment portion 48 into the object 2. While this is one manner of attachment, obviously other manners of attachment can likewise be used including but not limited to other types of fasteners (nails, etc.), other mechanical means, straps, suction cups, hook and loop fasteners, etc.

Figure 1:
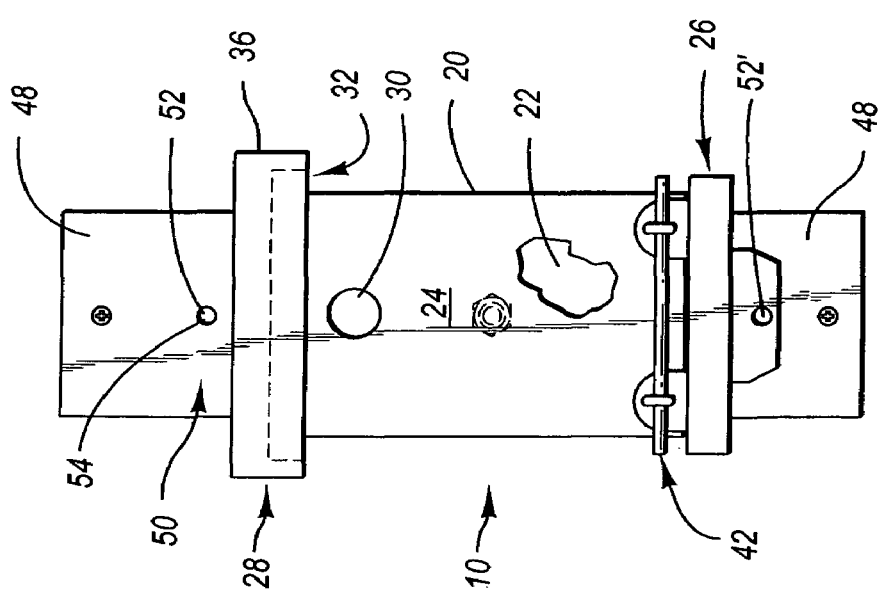
FIG. 1 shows a first front side view of one embodiment of the present invention.
Figure 3:
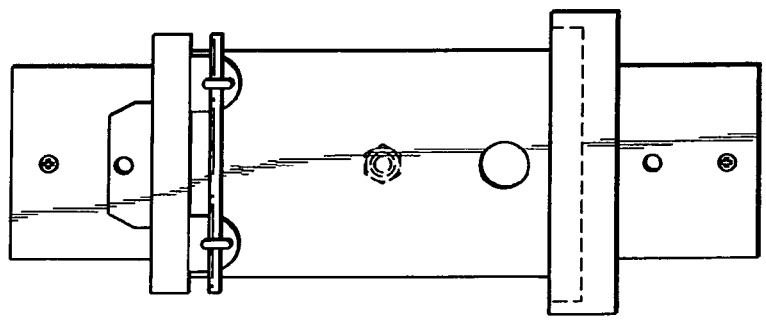
FIG. 3 shows a front side view of the embodiment of FIG. 1 shown fully rotated.

Thus, in use FIG. 1 shows the present invention shown in its nesting position. FIG. 2 shows the present invention being rotated from its feeding position into its feeding position. FIG. 3 shows the present invention in the feeding position. FIG. 4 showing a perspective view (feeding position) of the present invention being filled with feed 4 by a user. FIG. 5 showing a cross-sectional side view of the present invention (feeding position) shown as attached to an object 2, such as a tree.

In one illustrative use of the present invention, after acquiring the device a user would then, through use of a fastener or other manner, mount the present invention via the attachment portion to the object (tree). Then, depending on whether or not the initial use of the present invention is for feeding and/or nesting purposes, the user would then lock the housing within the appropriate position for that use. If the initial use is going to be for feeding purposes, then the user would unlock the lid of the housing, fill the housing with bird seed/feed, and would then close and relock the lid. In doing so the birdseed should spill out of the hole in the outside surface of the housing and come to rest upon the feed holding portion of the present invention. If the device is being used for housing, obviously birdseed would not be placed inside it and the roof portion would be locked into place thereby providing shelter for the entrance into the birdhouse (the hole through the outside surface of the bird feeder).

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A combination bird house and bird feeder device convertible between a bird house mode and a bird feeder mode, said device for attaching to an object, said device comprising:

a housing defining an internal chamber and having at least one outside surface, said housing having a closed first end and a closed second end with said internal chamber defined there-between, said housing further defining at least one hole there-through said outside surface adjacent said second end, wherein said first end comprises a lid portion closing said first end; and a pivotable attachment for interconnecting said housing to said object, said pivotable attachment for allowing said housing to rotate about its horizontal axis, from a feeding position where said first end is oriented above said second end to a nesting position where said second end is above said first end.

2. The device of claim 1, further comprising a lock allowing said device to be locked in said feeding position or said nesting position.

3. The device of claim 1, wherein said second end connects with a base portion, said base portion providing a feed holding portion.

4. The device of claim 1, wherein said second end connects with a base portion, said base portion providing a roof portion.

5. The device of claim 1 wherein said lid portion is configured for closing and opening.

6. The device of claim 5, further comprising a hinge portion hingedly connecting said lid to said first end.

7. The device of claim 6, wherein said lid is configured for locking shut.

8. The device of claim 1, wherein said second end comprises a bottom, said bottom closing said second end, whereas said first end is open, comprising a top configured for opening.

9. A combination bird house and bird feeder device convertible between a bird house mode and a bird feeder mode, said device for attaching to an object, said device comprising:
   a housing defining an internal chamber and having at least one outside surface, said housing having a closed first end and a closed second end with said internal chamber defined there-between, said housing further defining at least one hole there-through said outside surface adjacent said second end;
   a pivotable attachment for interconnecting said housing to said object, said pivotable attachment for allowing said housing to rotate about its horizontal axis, from a feeding position where said first end is oriented above said second end to a nesting position where said second end is above said first end; and
   a lock allowing said device to be locked in said feeding position or said nesting position.

10. The device of claim 9, wherein said second end connects with a base portion, said base portion providing a feed holding portion.

11. The device of claim 9, wherein said second end connects with a base portion, said base portion providing a roof portion.

12. The device of claim 9, wherein said first end comprises a lid portion closing said first end.

13. The device of claim 12, wherein said lid portion is configured for closing and opening.

14. The device of claim 13, further comprising a hinge portion hingedly connecting said lid to said first end.

15. The device of claim 14, wherein said lid is configured for locking shut.

16. The device of claim 9, wherein said second end comprises a bottom, said bottom closing said second end, whereas said first end is open, comprising a top configured for opening.

17. A combination bird house and bird feeder device convertible between a bird house mode and a bird feeder mode, said device for attaching to an object, said device comprising:
   a housing defining an internal chamber and having at least one outside surface, said housing having a closed first end and a closed second end with said internal chamber defined there-between, said housing further defining at least one hole there-through the outside surface adjacent said second end;
   a pivotable attachment for interconnecting said housing to said object, said pivotable attachment for allowing said housing to rotate about its horizontal axis, from a feeding position where said first end is oriented above said second end to a nesting position where said second end is above said first end;
   a lock allowing said device to be locked in said feeding position or said nesting position;
   wherein said second end connects with a base portion, said base portion providing a feed holding portion;
   wherein said base portion providing a roof portion;
   wherein said first end comprises a lid portion closing said first end, said lid portion is configured for closing and opening, further comprising a hinge portion hingedly connecting said lid to said first end, wherein said lid is configured for locking shut.

* * * * *